United States Patent
Peksa et al.

(10) Patent No.: US 11,912,342 B2
(45) Date of Patent: Feb. 27, 2024

(54) ASSEMBLY AND METHOD FOR REVERSING DRIVER'S AND PASSENGER'S SIDES IN A TRUCK CAB

(71) Applicant: Fontaine Modification Company, Charlotte, NC (US)

(72) Inventors: Ian Peksa, Concord, NC (US); Phillip Moua, Dallas, NC (US); Dan Jaynes, Mt Holly, NC (US)

(73) Assignee: Fontaine Modification Company, Charlotte, NC (US)

( * ) Notice: Subject to any disclaimer, the term of this patent is extended or adjusted under 35 U.S.C. 154(b) by 525 days.

(21) Appl. No.: 17/166,361

(22) Filed: Feb. 3, 2021

(65) Prior Publication Data

US 2022/0242193 A1 Aug. 4, 2022

(51) Int. Cl.
| | |
|---|---|
| *B62D 25/14* | (2006.01) |
| *B60H 1/00* | (2006.01) |
| *B60K 37/00* | (2006.01) |
| *B62D 1/16* | (2006.01) |

(52) U.S. Cl.
CPC ....... *B62D 25/142* (2013.01); *B60H 1/00207* (2013.01); *B60H 1/00378* (2013.01); *B60H 1/00585* (2013.01); *B60K 37/00* (2013.01); *B62D 1/16* (2013.01); *B60H 2001/00214* (2013.01)

(58) Field of Classification Search
CPC .................................................. B62D 25/142
USPC ..................................................... 296/70, 72
See application file for complete search history.

(56) References Cited

U.S. PATENT DOCUMENTS

| | | |
|---|---|---|
| 4,601,510 A | 7/1986 | Schoppel et al. |
| 5,857,726 A | 1/1999 | Yokoyama et al. |
| 5,863,093 A | 1/1999 | Novoa et al. |
| 5,989,302 A | 11/1999 | Krowech |
| 6,260,914 B1 | 7/2001 | Nieminski et al. |
| 6,371,551 B1 | 4/2002 | Hedderly |
| 6,851,742 B1 | 2/2005 | Kubiak |
| 7,370,719 B2 | 5/2008 | Sakamoto |
| 8,100,463 B2 * | 1/2012 | Penner ................. B60K 37/00 296/72 |

(Continued)

FOREIGN PATENT DOCUMENTS

| | | |
|---|---|---|
| CA | 2373779 C | 3/2007 |
| CA | 2297703 C | 9/2008 |

(Continued)

*Primary Examiner* — Dennis H Pedder
(74) *Attorney, Agent, or Firm* — Andrus Intellectual Property Law, LLP

(57) ABSTRACT

An assembly facilitating installation of a steering column on an original passenger's side of a truck cab includes an aftermarket dash panel having a steering column opening configured to be located on the original passenger's side of the truck cab and an HVAC access opening configured to be located on an original driver's side of the truck cab. A first bracket has a forward portion for connection to original HVAC ductwork of the truck cab and has a rearward portion for connection to the aftermarket dash panel. The aftermarket dash panel comprises a single piece that extends from a left side of the truck cab to a right side of the truck cab. A method for moving a steering column of a truck cab from an original driver's side of the truck cab to an original passenger's side of the truck cab is also described.

20 Claims, 9 Drawing Sheets

(56) References Cited

U.S. PATENT DOCUMENTS

| | | | |
|---|---|---|---|
| 8,945,285 B2 | 2/2015 | Spryshak | |
| 10,457,333 B1 | 10/2019 | Allen et al. | |
| 2010/0297925 A1* | 11/2010 | Burns | F24F 11/65 454/75 |
| 2012/0187723 A1 | 7/2012 | Bergholtz et al. | |

FOREIGN PATENT DOCUMENTS

| | | |
|---|---|---|
| DE | 3619935 C2 | 2/1990 |
| DE | 19944530 C1 | 8/2000 |
| DE | 102012109321 A1 | 4/2014 |
| EP | 1642755 B1 | 11/2009 |
| EP | 2594463 A1 | 5/2013 |
| EP | 2752318 A1 | 7/2014 |
| FR | 2799718 A1 | 4/2001 |
| JP | H09240316 A | 9/1997 |
| JP | 2008260331 A | 10/2008 |

\* cited by examiner

ASSEMBLY AND METHOD FOR REVERSING DRIVER'S AND PASSENGER'S SIDES IN A TRUCK CAB

FIELD

The present disclosure relates to modifications to dashes in truck cabs that allow the driver's and passenger's sides of the truck cab to be reversed from their original positions.

BACKGROUND

U.S. Pat. No. 5,863,093 discloses an opening that is provided through the front of a truck cab assembly during the manufacture process for allowing access to the interior of the truck cab for installing components therein. The opening most preferably substantially extends from sidewall to sidewall in the horizontal direction, and substantially from the roof structure to the floor structure in the vertical direction. On an assembly line, the front opening is preferably oriented perpendicularly to the direction of travel of truck cabs along the assembly line during a major portion of the vehicle truck cab assembly process. A firewall-dashboard assembly which facilitates easier installation and assembly of certain components is also disclosed. Specifically, the firewall is pre-assembled and combined with a dashboard sub-assembly prior to mounting these components to the truck cab. The firewall-dashboard assembly preferably contains at least the instrument panel, and the brake, clutch, and accelerator mechanisms. The firewall-dashboard assembly is mounted in part to rails along the floor of the truck cab structure. The firewall-dashboard assembly and door frames of the truck sidewalls include brackets which position the firewall to define the lower boundary of a windshield window opening.

U.S. Pat. No. 5,857,726 discloses an instrument panel that is formed symmetrically with respect to a center of the panel. The instrument panel comprises a pair of recesses defined by left and right reinforcing/partition walls, and a pair of lower openings located under the recesses. A meter unit is mounted in the recess to oppose the driver seat. An under cover is mounted in the lower opening which is to oppose the driver seat. The under cover is formed with a hole through which a steering shaft is adapted to be passed. A tray is mounted in the recess which is to oppose the front passenger seat. A glove box is mounted in the lower opening which is to oppose the front passenger seat. The walls for defining the recesses of the instrument panel have a common fixing section usable for mounting any of the meter unit and the tray.

U.S. Pat. No. 6,260,914 discloses a dash reinforcement for a mobile vehicle with a passenger cab such as a sport utility vehicle, or medium or heavy-duty truck. The dash reinforcement may be a stamped sheet metal panel that strengthens the dash structure of the cab and provides for mounting of vehicle components. The dash reinforcement may be symmetrical about the centerline of the vehicle and this symmetry allows the panel to accommodate both left-hand drive and right-hand drive vehicle configurations. The dash reinforcement also includes 'Y' shaped passages for a driver control module and for accessory equipment such as heating, ventilation, and air conditioning (HVAC) modules. The unique shape of these passages or openings adds strength to the overall dash structure and hence the cab. The dash reinforcement may be engaged to a dash panel to form a dash assembly. The dash panels made be manufactured by the same metal stamping dies moved to account for left-hand versus right-hand drive and conventional versus cab-over-engine or low front engine configuration.

U.S. Pat. No. 6,371,551 discloses an integrated front body clip including an instrument panel support structure, steering column support structure, and cowl structure forming a shared, dependent, and complementary support structure between the A-Pillars of a vehicle. Front and rear magnesium casting, each having a plurality of cast in features, are clamshelled into a single integrated clip. The resultant integrated front body clip offers substantial weight and improves the torsional and bending strength characteristics as compared with traditional steel structures. By maximizing cast in features, redundancy between competing parts is eliminated with an increase in dimensional control. Further, by creating a hollow region within the resultant clip structure, heated or cooled air may be moved without complex ductwork. In an alternative preferred embodiment, the front casting is provided in three modular parts that may be arranged for use in left-side or right-side driving vehicles.

U.S. Pat. No. 7,370,719 discloses an instrument panel construction including a main instrument panel unit which is formed with an open cross sectional shape, and which comprises a plate shaped upper surface member which extends substantially in the horizontal direction of the body of the vehicle across its transverse direction, and a front surface member which curves towards the passenger compartment of the vehicle from said upper surface member and extends downwards substantially in the vertical direction; and in that this main instrument panel unit is made as a single unit from magnesium alloy by a die casting process, and is fixed to left and right front pillars.

U.S. Pat. No. 10,457,333 discloses a right-hand drive conversion for a medium duty truck. The conversion process includes removal of dash assembly components and a sub-dash from the cab of a medium duty truck, such as a Freightliner M2. The conversion dash assembly includes a unitary dash and a plurality of brackets. The brackets are mounted to the left and right cab walls and the firewall.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, an assembly facilitating installation of a steering column on an original passenger's side of a truck cab comprises an aftermarket dash panel having a steering column opening configured to be located on the original passenger's side of the truck cab and an HVAC access opening configured to be located on an original driver's side of the truck cab. A first bracket has a forward portion configured to be connected to original HVAC ductwork of the truck cab and has a rearward portion configured to be coupled to the aftermarket dash panel. The aftermarket dash panel comprises a single piece configured to extend from a left side of the truck cab to a right side of the truck cab.

According to another example, a method for moving a steering column of a truck cab from an original driver's side of the truck cab to an original passenger's side of the truck cab comprises removing an original dash and portions of original HVAC ductwork connected to the original dash from the truck cab and retaining in place original defrost vents and other portions of the original HVAC ductwork connected thereto. The method includes removing the steering column and steering column bracket from a cowl of the truck cab and reattaching the steering column bracket and the steering column to the cowl on the original passenger's side of the truck cab. The method also includes attaching a forward portion of a first bracket to the retained portions of the original HVAC ductwork and coupling a rearward portion of the first bracket to an aftermarket dash panel.

BRIEF DESCRIPTION OF THE DRAWINGS

Examples of dash assemblies are described with reference to the following Figures. The same numbers are used throughout the Figures to reference like features and like components.

DETAILED DESCRIPTION

In general, vehicles in the United States are left-hand drive, while vehicles in many non-U.S. countries are right-hand drive. For vehicles such as waste management trucks, street cleaners, postal trucks, and other municipal-type trucks, it is desirable to have the steering wheel on the opposite side of where it is normally located in a given country to allow the driver of the vehicle to be closer to the side of the road. However, it is logistically complicated and expensive to produce vehicles having opposite-side steering wheels (in comparison to a typical vehicle in that country) given the low demand for same. Therefore, it is desirable to be able to modify a vehicle that is mass-produced for a given country in the aftermarket by switching the steering wheel to the opposite side of where the manufacturer originally installed it. The present disclosure provides details of an assembly facilitating installation of a steering column on an original passenger's side of a truck cab and a method for moving a steering column of a truck cab from an original driver's side of the truck cab to an original passenger's side of the truck cab.

In the following description, the words "front," "forward," "foremost" and similar adjectives refer to the portions or components that are forwardly located with respect to the vehicle's forward direction of travel. The words "rear," "rearward," "rearmost", and similar adjectives refer to the opposite portions of those components, i.e., those that are rearward of the forward portions in the vehicle's forward direction of travel. "Left" and "right" refer to the left and right of the vehicle as experienced by a driver or passenger sitting therein and facing forward in the direction of forward travel. "Inner" refers to a surface of a component that cannot usually be seen while the component is installed, while "outer" refers to those portions that can be seen on the installed component. "Original" refers to the layout of the truck cab as designed and assembled by the vehicle manufacturer and to any components that were installed by the original vehicle manufacturer. "Original" may in some instances include components that were installed in the aftermarket as part of a prior modification to the vehicle, such as to repair or replace a broken or faulty component, but does not include aftermarket components that are installed as part of the modifications described herein below related to switching the driver's and passenger's sides of the vehicle. "Aftermarket" includes any components not installed by the original vehicle manufacturer.

Figure 1:
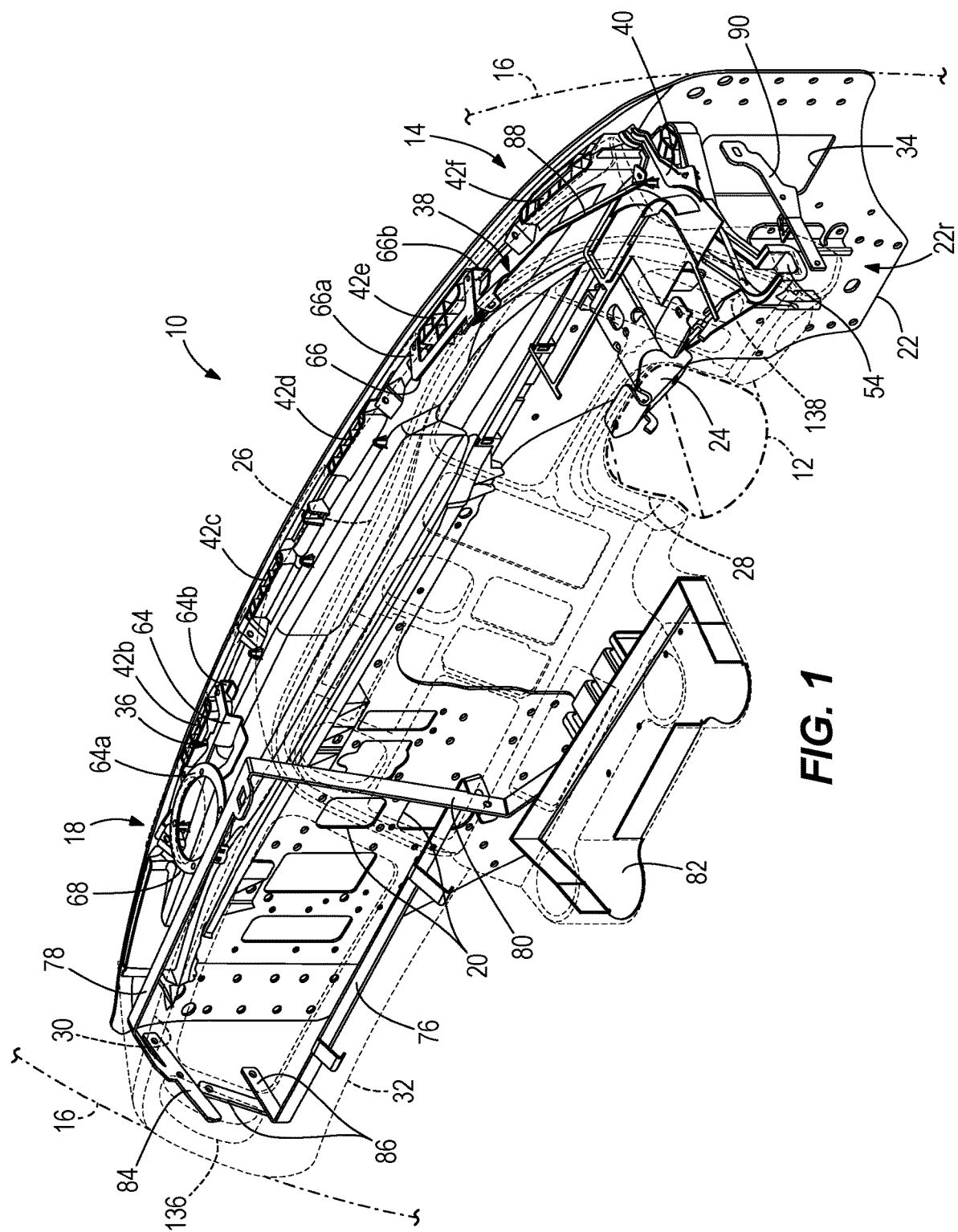
FIG. 1 illustrates an aftermarket dash panel in phantom over original HVAC ductwork and a cowl of a truck cab.

FIG. 1 illustrates one example of an assembly 10 facilitating installation of a steering column 12 on an original passenger's side 14 of a truck cab 16. As noted above, the steering column 12 was originally installed on the original driver's side 18 of the truck cab 16, at the location shown by the steering-related apertures 20 extending through the cowl 22 (sometimes called a "firewall") of the truck's cab 16. The steering column 12 is partially shown in phantom as being installed on a steering column bracket 24, which is attached to the rear face 22r of the cowl 22 to support the steering column 12, which in turn supports a steering wheel (not shown). The cowl 22 also supports other components in the truck cab 16 and in the engine compartment, as will be described further herein below. As is known, the cowl 22 separates the interior of the truck cab 16 from the engine compartment and can be made of a sheet of pressed steel or similar materials.

An aftermarket dash panel 26 is shown in phantom over the cowl 22. The aftermarket dash panel 26 includes a steering column opening 28 configured to be located on the original passenger's side 14 of the truck cab 16. As shown, the steering column 12 is located in the steering column opening 28. The aftermarket dash panel 26 also includes an heating, ventilation, and air-conditioning (HVAC) access opening 30 configured to be located on the original driver's side 18 of the truck cab 16. An access panel 32 is configured to be located in the HVAC access opening 30 of the aftermarket dash panel 26. Removal of the access panel 32 allows for access to HVAC components, such as a blower motor and fresh air filter, and to the vents, ductwork, and electrical wiring (not shown) in this area. These HVAC-related components were originally installed on the original passenger's side 14 of the truck cab 16 and connected to a fresh air intake water separator by way of an opening 34 in the cowl 22, but are relocated to the original driver's side 18 as part of the dash modification in order to make room for the relocated steering column 12.

The aftermarket dash panel 26 and the access panel 32 are supported in the truck cab 16 by way of bracket assemblies 36, 38 that couple the aftermarket dash panel 26 to the original HVAC ductwork 40, which is in turn supported by the cowl 22, and to the side A-pillars (not shown) of the truck cab 16. These bracket assemblies 36, 38 will be described further herein below.

Figure 2:
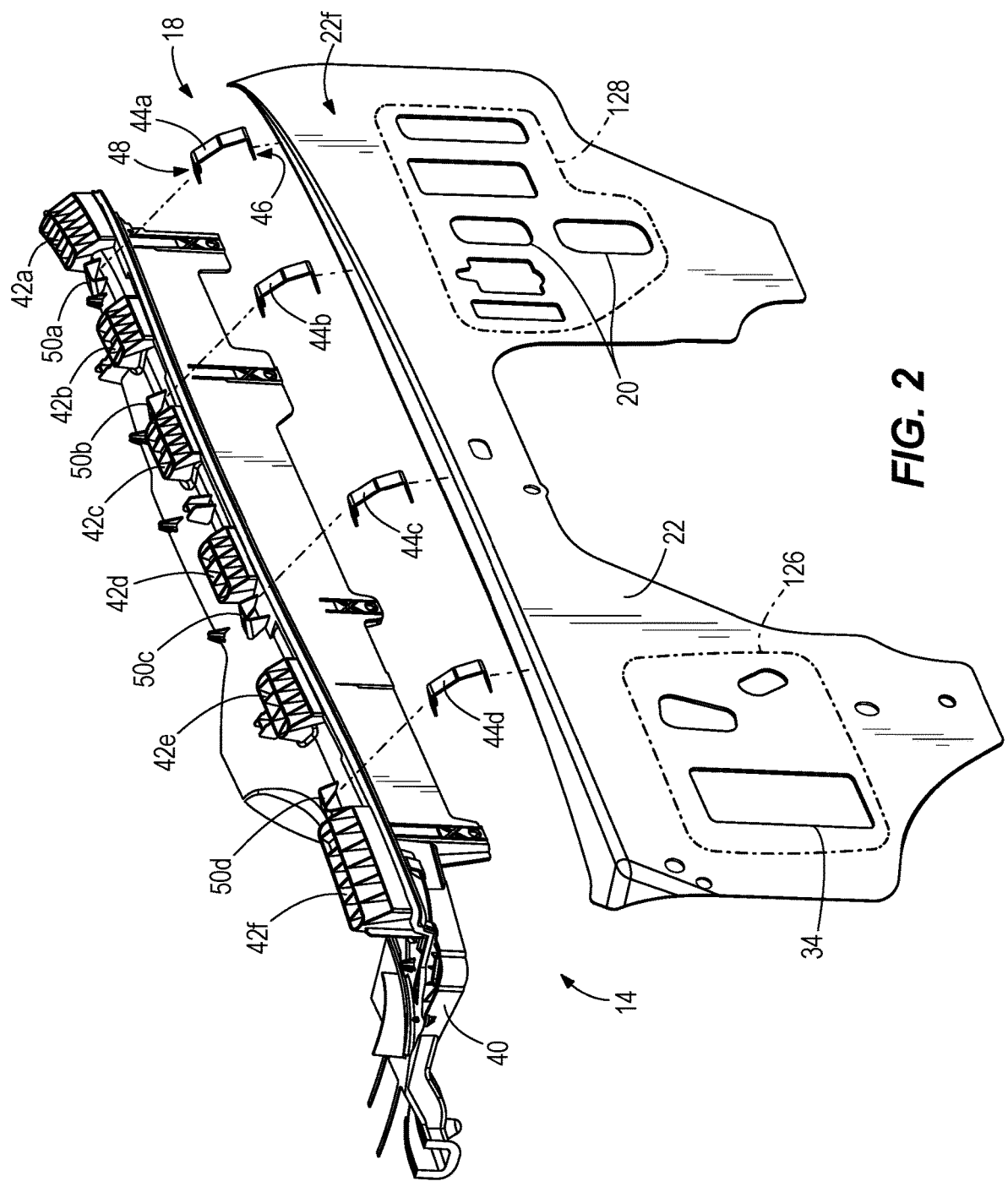
FIG. 2 is an exploded front perspective view of the cowl and the original HVAC ductwork of the truck cab.
Figure 3:
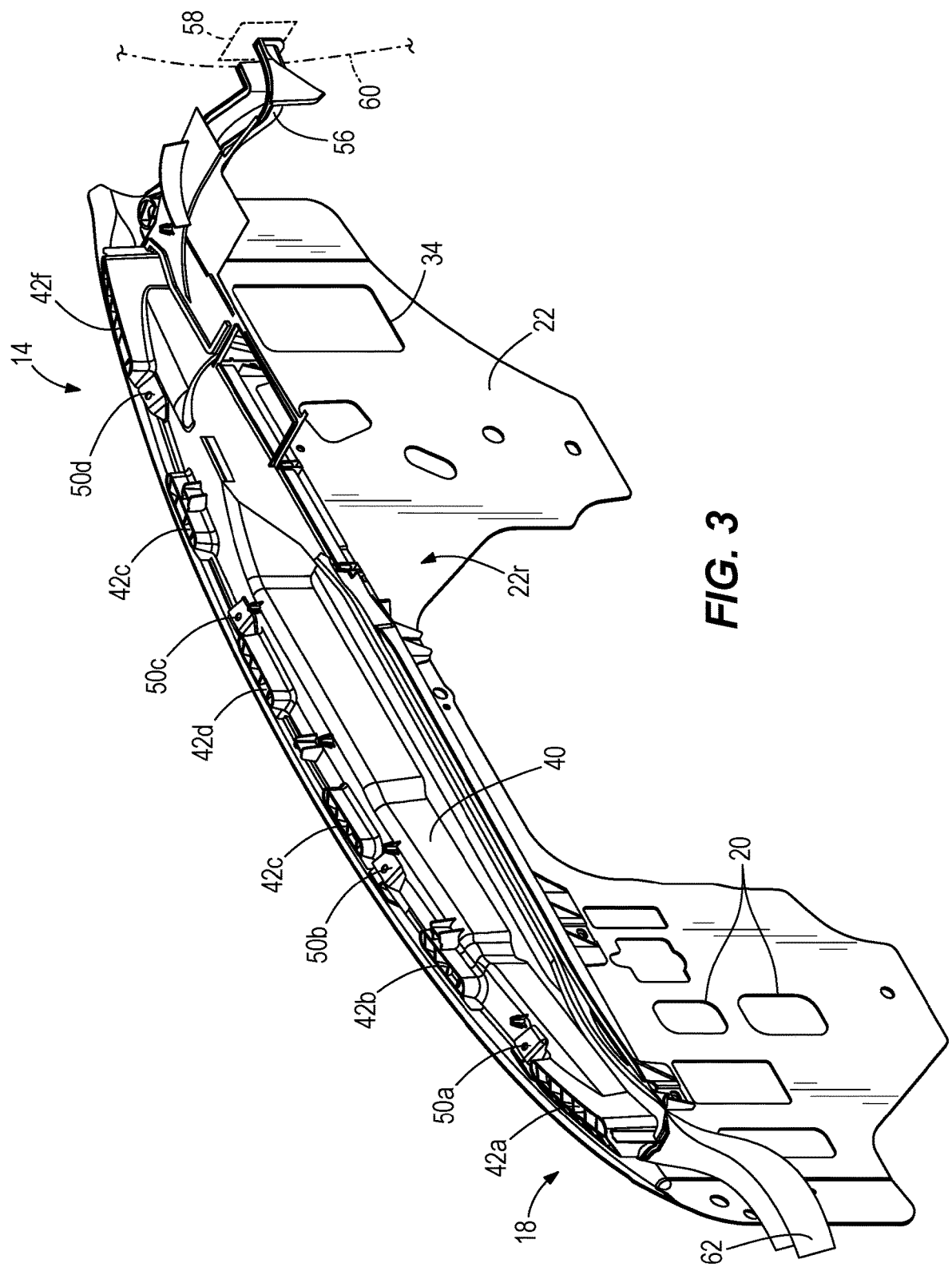
FIG. 3 is a rear perspective view of the components of FIG. 2 in an assembled state.

In order to prepare the original HVAC ductwork 40 to support the bracket assemblies 36, 38, which in turn support the aftermarket dash panel 26, additional modifications are made. For example, as shown in FIGS. 2 and 3, rearmost portions of the original HVAC ductwork 40 may be removed, leaving the original HVAC ductwork 40 shown herein. This is done so that the relocated steering column bracket 24, steering column 12, aftermarket dash panel 26, and various gauges, vents, and other dash accessories now to be located on the original passenger's side 14 fit in the truck cab 16 in a manner that is comfortable and relatively familiar to the driver. Note that the forward portions of the original HVAC ductwork 40 including the original defrost vents 42*a-f* are retained. This provides more efficient and reliable windshield defrost capabilities than modifications that remove most, if not all, of the original HVAC ductwork from the truck cab 16. The portions of the original HVAC ductwork that are removed may be disassembled (as for hoses) or cut away (as for ductwork) and any holes in the retained portions of the HVAC ductwork that need to be closed for purposes of the dash modification can be covered with new ductwork.

Because the original HVAC ductwork 40 is now being relied upon to support the aftermarket dash panel 26, it is desirable to reinforce the connection of the original HVAC ductwork 40 to the cowl 22. For this purpose, a plurality of brackets 44*a-d* can be provided. Each bracket 44*a-d* has a forward portion 46 (see, for example, bracket 44*a*) configured to be connected to the cowl 22 of the truck cab 16 and has a rearward portion 48 configured to be connected to the original HVAC ductwork 40. More specifically, the forward portion 46 of each bracket 44*a-d* is connected to a ledge (not shown, but located below and supporting the original HVAC ductwork 40) formed on the rear face 22*r* of the cowl 22. In other examples, the forward portion 46 of each bracket 44*a-d* could be connected to the front face 22*f* of the cowl 22 such as by being hooked over the top edge thereof. Meanwhile, the rearward portion 48 of each bracket 44*a-d* is connected within a respective pocket 50*a-d* integrally formed within the original HVAC ductwork 40. These pockets 50*a-d* are already provided with holes for fasteners, as they were originally used as locations for receiving bolts or screws that attached the original dash trim panel to the original HVAC ductwork 40. Of course, the rearward portion 48 of each bracket 44*a-d* could be connected to the original HVAC ductwork 40 in additional or alternative locations. Attachments at both ends of the brackets 44*a-d* can be made by fasteners such as bolts or screws and/or can be made by welding, riveting, or gluing. Fewer or more brackets could be used than the four shown herein.

Figure 4:
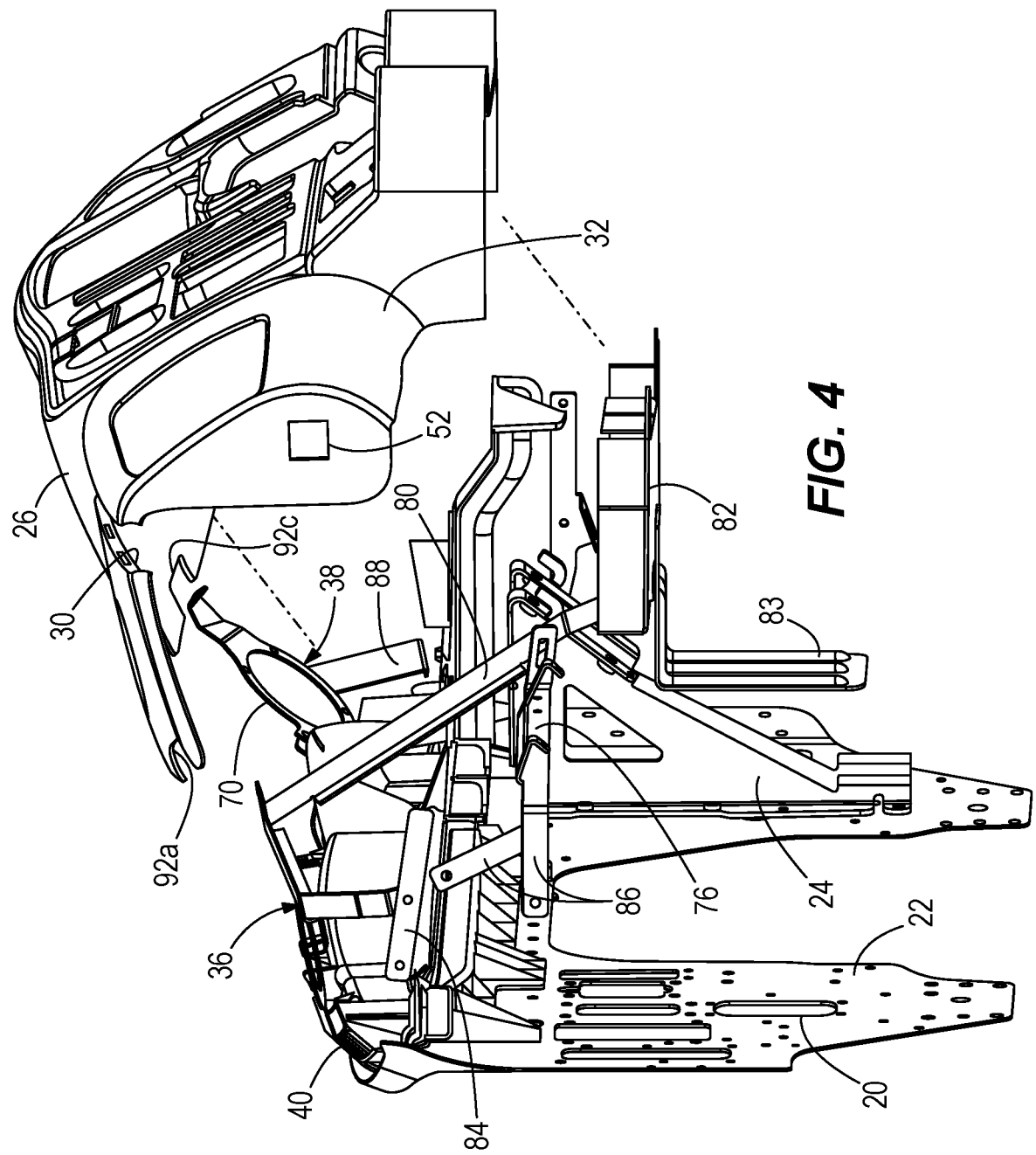
FIG. 4 is a perspective view from an original driver's side of the truck cab, showing the aftermarket dash panel removed from bracket assemblies attached to the original HVAC ductwork.
Figure 5:
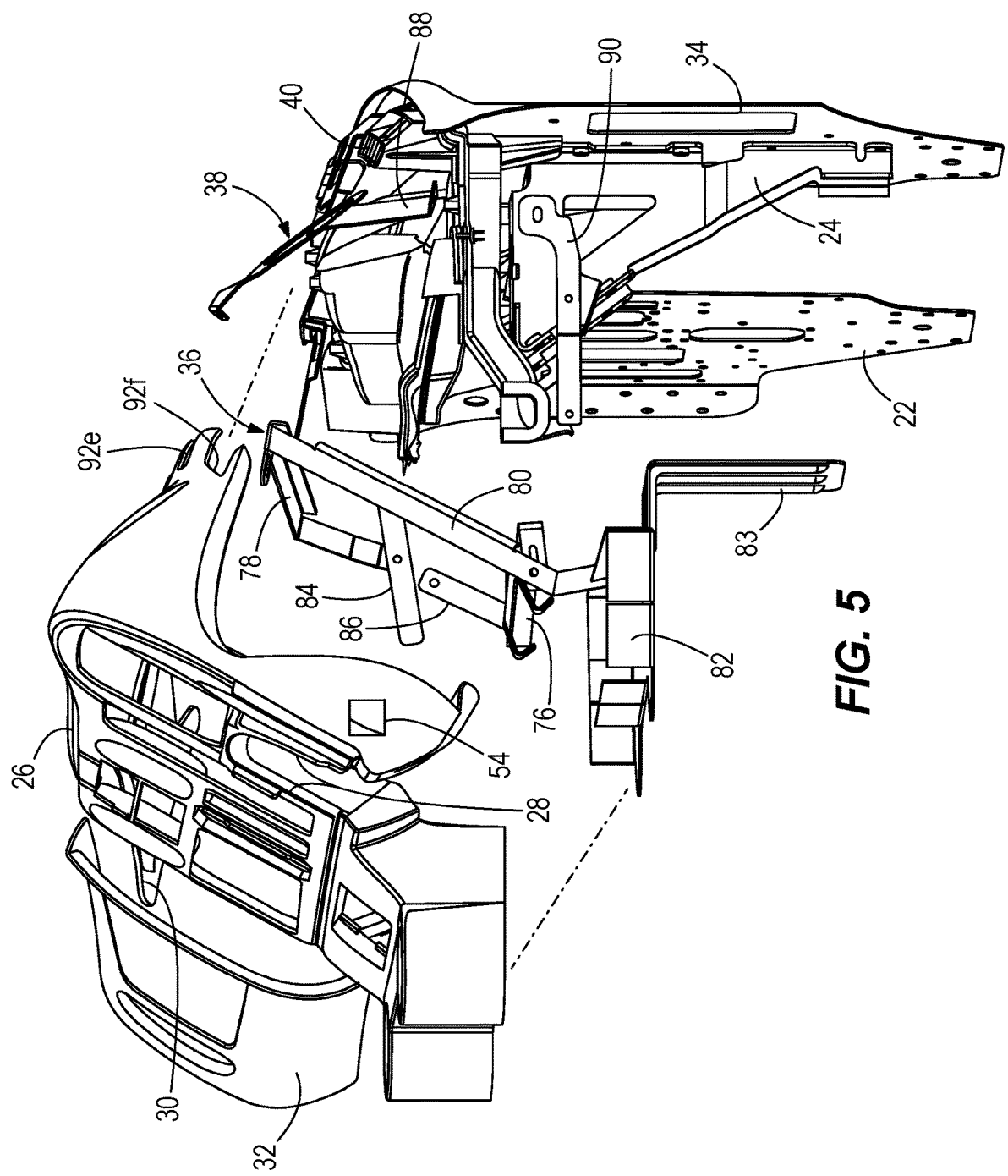
FIG. 5 is a perspective view from an original passenger's side of the truck cab, showing the aftermarket dash panel removed from the bracket assemblies attached to the original HVAC ductwork.

Because the original HVAC ductwork 40 was partially removed for purposes of the dash modification and because vents for providing heated or cooled air to the driver and passenger are located in different positions on the aftermarket dash panel 26 than on the original dash, it is desirable to connect the original HVAC ductwork 40 to the new or relocated vents as well as to the side window defrost vents. For example, the assembly 10 includes ducts configured to connect the retained original HVAC ductwork 40 to apertures in portions of the aftermarket dash panel 26 that face the doors of the truck cab 16. These apertures are shown in FIGS. 4 and 5 at 52 on the original driver's side 18 of the truck cab 16 and at 54 on the original passenger's side 14 of the truck cab 16 and are configured to be aligned with vents in the doors that communicate with the side window defrost vents, as is known. For example, the vent 58 and door 60 on the original passenger's side 14 are shown in phantom in FIG. 3. The duct 56 leading to the aperture 54 on the original passenger's side 14 that feeds air to the vent 58 may be part of the original HVAC ductwork 40, as shown here. Alternatively, the duct 56 at this location may be an aftermarket duct. An original or aftermarket duct 62 can be provided on the original driver's side 18 to feed air to the aperture 52, then to a vent in the original driver's side door similar to that shown at 58. (This duct 62 is not shown in FIG. 4 in order to better show the bracket assembly 36 therebehind.)

Figure 6:
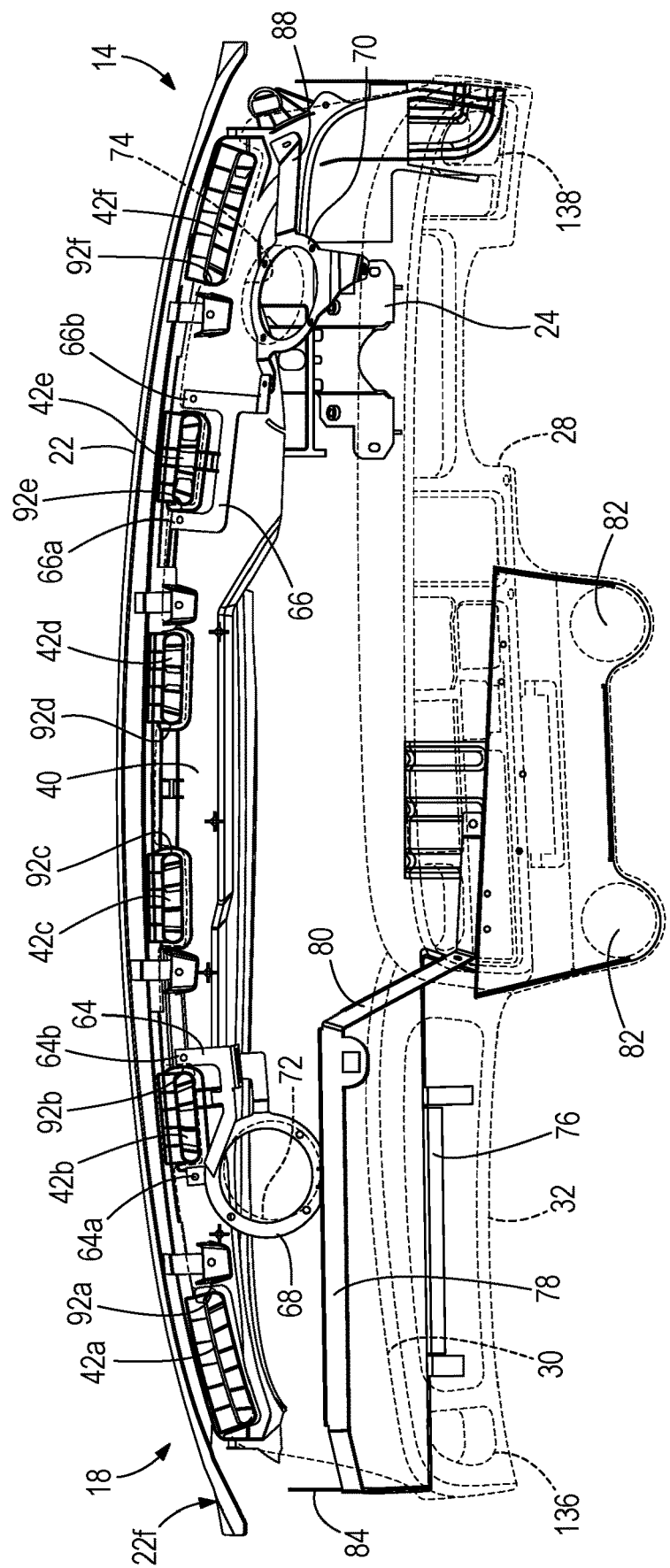
FIG. 6 is a top view of the aftermarket dash panel installed over the original HVAC ductwork, shown in phantom.

After any necessary replacement ducts are attached to the original HVAC ductwork 40 and any other underlying dash electronics and components are reinstalled, the aftermarket dash panel 26 can be installed by way of the first and second bracket assemblies 36, 38. The bracket assemblies 36, 38 can be attached to the aftermarket dash panel 26 and then to the original HVAC ductwork 40 or vice versa. Referring to FIGS. 1 and 4-6, each of the bracket assemblies 36, 38 comprises at least a first bracket 64, 66, respectively. Each first bracket 64, 66 has a forward portion configured to be connected to the retained original HVAC ductwork 40 of the truck cab 16 and has a rearward portion configured to be coupled to the aftermarket dash panel 26. In the present example, the forward portions of the first brackets 64, 66 each comprise at least two arms 64*a*, 64*b* and 66*a*, 66*b*, and each arm is configured to be connected to the original HVAC ductwork 40 at distinct locations. Specifically, as shown in FIGS. 1 and 6, the arms 64*a*, 64*b* are connected to the original HVAC ductwork 40 on either side of the original defrost vent 42*b*, and the arms 66*a*, 66*b* are connected to the original HVAC ductwork 40 on either side of the original vent 42*e*. Such an arrangement provides multiple points of attachment for each bracket 64, 66, thereby providing a stronger and more stable connection between the original HVAC ductwork 40 and the aftermarket dash panel 26, resulting in less vibration while the truck is in motion. As shown in FIG. 1, the foremost ends of the arms 64*a*, 64*b* and 66*a*, 66*b* can be hooked over the retained portions of the original HVAC ductwork 40.

As noted, each first bracket 64, 66 is part of a respective bracket assembly 36, 38. As shown here, each bracket assembly 36, 38 has multiple segments, which can be different brackets that are bolted, screwed, riveted, pinned, or frictionally engaged together and/or single brackets that have bends and/or complex shapes formed therein. Such multisegmented bracket assemblies 36, 38 allow for multiple attachment points to the original HVAC ductwork 40, the A-pillars of the truck cab 16, and the aftermarket dash panel 26, again resulting in a stronger and more stable installation of the aftermarket dash panel 26 within the truck cab 16 and less vibration while the truck is in motion. Additionally, as shown in FIGS. 1, 4, and 6, at least one of the segments in each bracket assembly 36, 38 has a ring-shaped portion 68, 70 configured to align with a respective hole 72, 74 in the aftermarket dash panel 26 that is configured to surround a speaker (not shown). This provides extra support in areas that hold relatively concentrated weight.

Further segments of the bracket assembly 36 on the original driver's side 18 of the truck cab 16 are configured to support other dash components from the retained portions of the original HVAC ductwork 40. For example, referring now to FIGS. 1 and 4-6, at least one of the segments 76 is configured to support the access panel 32 in the HVAC access opening 30, while another at least one of the segments 78 is configured to support the aftermarket dash panel 26 just above the HVAC access opening 30. Yet another segment 80 of the first bracket assembly 36 supports a tray 82 configured to support the cupholders in the aftermarket dash panel 26. The tray 82 may also be supported by an L-shaped plate 83 coupled to the cab's floor between the footwell areas. The generally horizontally oriented segment 78 is coupled to the ring-shaped portion 68, which is in turn coupled to the first bracket 64. The generally horizontally oriented segment 76 is coupled to the segment 78 by way of the more vertically oriented segment 80. The segment 78 is also coupled to the original driver's side A-pillar by way of segment 84, while the segment 76 is also coupled to the A-pillar by way of segment 86.

A further segment 88 of the bracket assembly 38 on the original passenger's side 14 of the truck cab 16 is connected to the aftermarket dash panel 26 as well. This further segment 88 extends from the right side of the ring-shaped portion 70, which in turn is coupled to the first bracket 66. An additional bracket 90 directly connects between the A-pillar on the original passenger's side 14 and the portion of the aftermarket dash panel 26 that faces the original passenger's side door 60.

Each of the bracket assemblies 36, 38 can be made of steel and can have pre-formed holes for receiving fasteners at the ends thereof that are to be connected to the original HVAC ductwork 40, the A-pillars, or the aftermarket dash panel 26. In some examples, the ends of the bracket segments that are to be connected to the original HVAC ductwork 40 or to the A-pillars are fastened thereto, such as by bolting or screwing, while the ends of the segments that are to be connected to the aftermarket dash assembly are adhered thereto.

As shown in FIG. 6, the aftermarket dash panel 26 comprises a single piece configured to extend across an entire width of the truck cab 16, i.e., from one A-pillar to the other. The aftermarket dash panel 26 can be made of fiberglass or any other suitable material. A foremost portion of the aftermarket dash panel 26 includes cutouts 92a-f configured to receive the respective original defrost vents 42a-f of the original HVAC ductwork 40. This provides a clean aesthetic to the dash without the need for an extra cover in this area. However, a trim piece may be added over the area where the gauges and user input devices are located, as is common.

Figure 7:
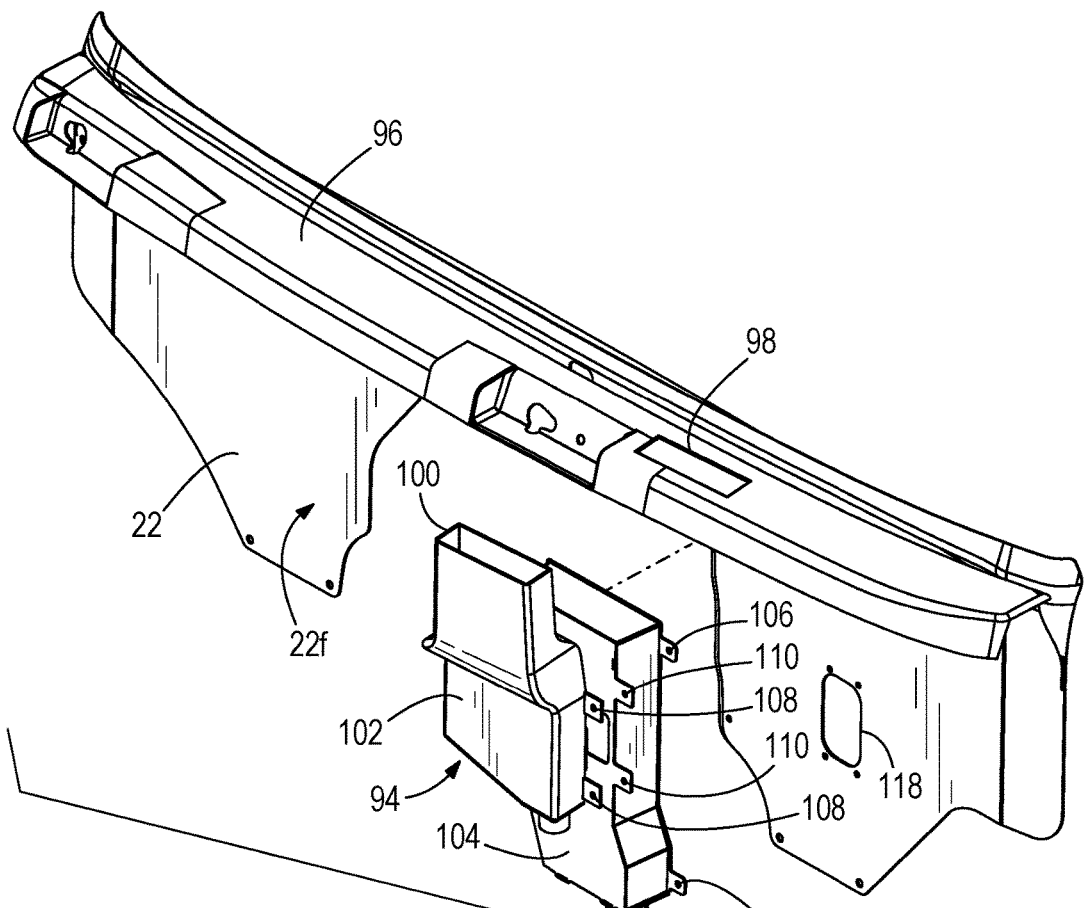
FIG. 7 is an exploded front perspective view of a water separator to be installed on the cowl.
Figure 8:
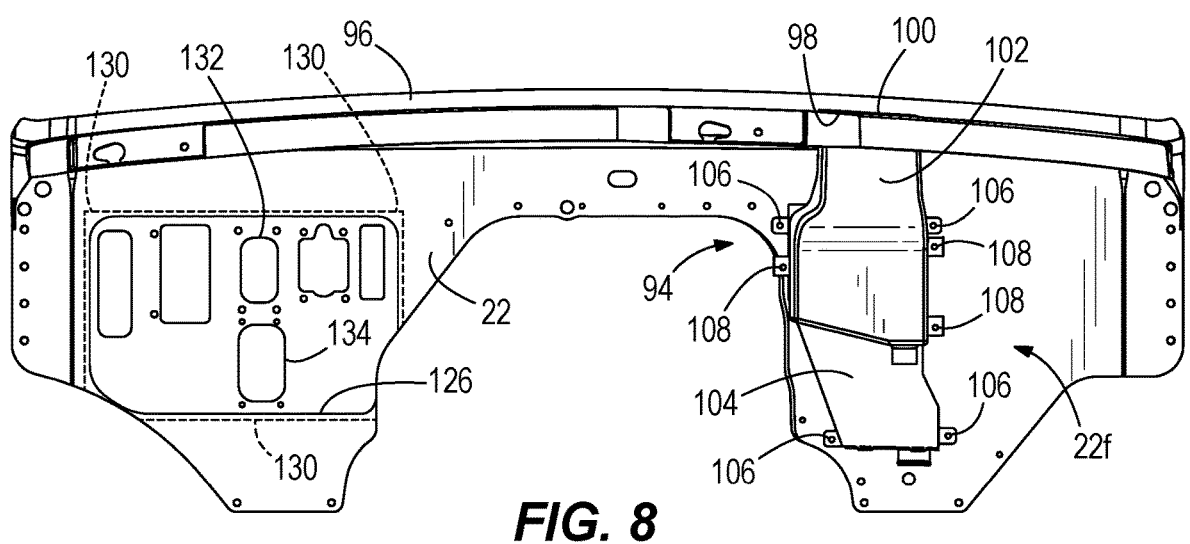
FIG. 8 is a front view of the water separator installed on the cowl.

Now turning to FIGS. 7 and 8, the front face 22f of the cowl 22 (i.e., the face inside the engine compartment) is shown with a water separator 94. FIG. 7 shows the cowl 22, water separator 94, and an aftermarket rain tray 96 in an exploded view, while FIG. 8 shows these components assembled. As is known, the water separator 94 is configured to receive intake air from an atmosphere surrounding the truck cab 16, such as by way of an opening 98 in the rain tray 96 through which an inlet 100 of the water separator 94 extends. The water separator 94 includes an upstream plenum 102 receiving the air from the atmosphere via the inlet 100. The upstream plenum 102 is in fluid communication with a downstream plenum 104 of the water separator 94, which is configured to be connected to the front face 22f of the cowl 22 of the truck cab 16, such as by way of fasteners extending through flanges 106. In turn, the upstream plenum 102 is connected to the downstream plenum 104 such as by way of fasteners extending thorough flanges 108 on the upstream plenum 102 that correspond to flanges 110 on the downstream plenum 104.

Figure 9:
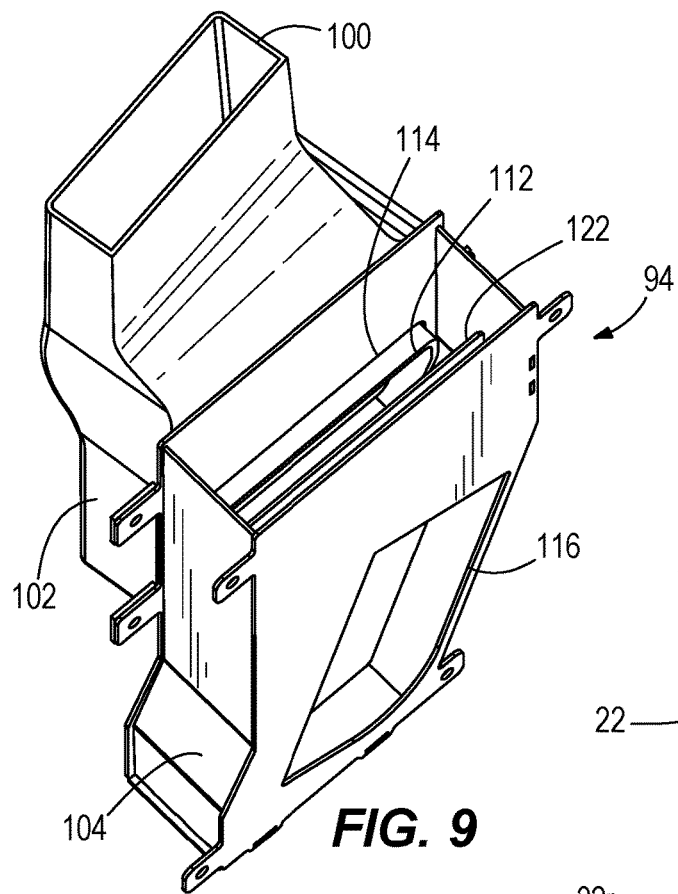
FIG. 9 is a top rear perspective view of the water separator.
Figure 10:
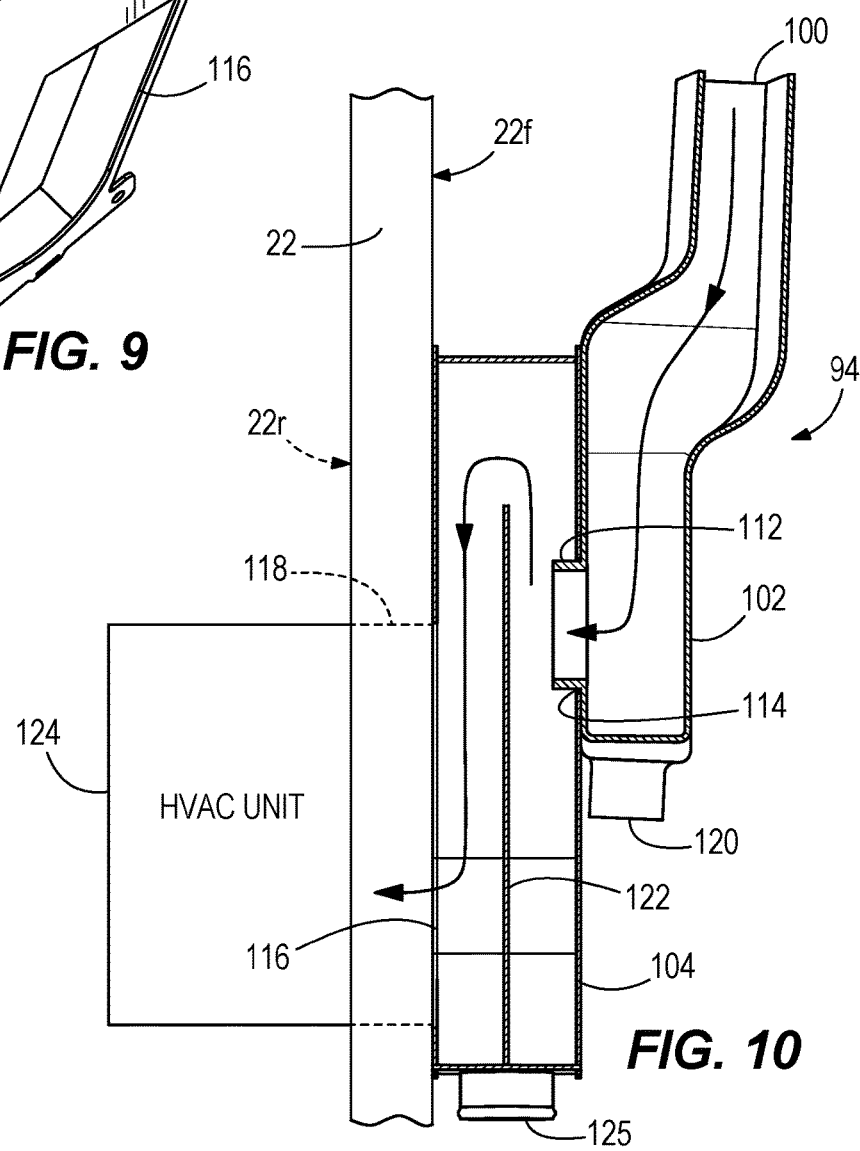
FIG. 10 is a side cross-sectional view of the water separator.

FIGS. 9 and 10 illustrate details of the water separator 94. The upstream plenum 102 has an inlet 100 receiving the air from the atmosphere and an outlet 112 in fluid communication with the downstream plenum 104. The downstream plenum 104 has an inlet 114 receiving the air from the upstream plenum 102 and an outlet 116 configured to be located adjacent an opening 118 in the cowl 22. FIG. 9 shows how the outlet 112 of the upstream plenum 102 fits through the inlet 114 of the downstream plenum 104 to provide a tight fit. The opening 118 in the cowl 22 is partially shown in FIG. 7, it being understood that it would have approximately the same size and shape as the original opening 34 in the cowl 22 for providing fluid communication between the original water separator and the blower motor of the HVAC unit 124.

As shown by the arrows in FIG. 10, after air enters the upstream plenum 102, it flows through the outlet 112 of the upstream plenum 102 and inlet 114 into the downstream plenum 104. Any water that entered the upstream plenum 102 via the opening 98 in the rain tray 96 and the inlet 100 is collected at the bottom end of the upstream plenum 102 and exits via a drain valve 120. Air entering the downstream plenum 104 encounters a baffle 122 and flows upward along the baffle 122, changes direction near the top end of the downstream plenum 104, and then exits via the outlet 116, through the opening 118 in the cowl 22, and enters the HVAC unit 124. Any water that manages to enter the downstream plenum 104 from the upstream plenum 102 hits the upstream side of the baffle 122 and flows down to the lower end of the downstream plenum 104. Any water droplets that might still be entrained in the air on the downstream side of the baffle 122 also fall to the lower end of the downstream plenum 104. Water collected at the lower end of the downstream plenum 104 exits via drain valve 125. The circuitous route through the upstream and downstream plenums 102, 104 prevents much water from entering the HVAC unit 124.

Figure 11:
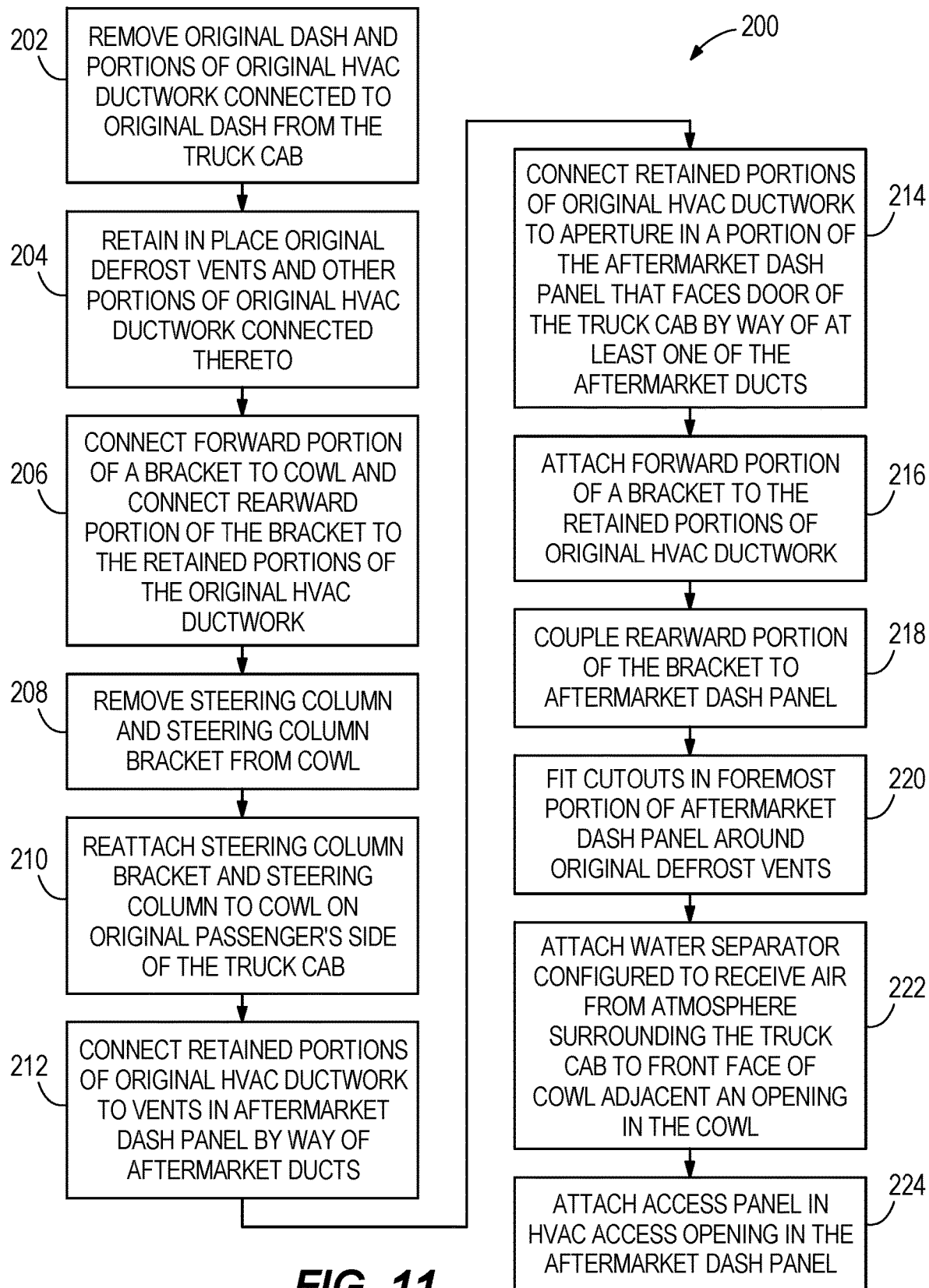
FIG. 11 shows a method for moving a steering column of a truck cab from an original driver's side of the truck cab to an original passenger's side of the truck cab.

FIG. 11 will be used to describe a method 200 for moving a steering column 12 of a truck cab 16 from an original driver's side 18 of the truck cab to an original passenger's side 14 of the truck cab 16. As shown at 202, the method includes removing an original dash and portions of original HVAC ductwork connected to the original dash from the truck cab 16. The original dash can be removed by unfastening and/or prying off the original dash trim, support panel(s), and any components thereunder. As shown at 204, and as described with respect to FIGS. 2 and 3, the method includes retaining in place original defrost vents 42a-f and other portions of the original HVAC ductwork 40 connected thereto. Also as noted herein above, and as shown at 206, the connection between the retained portions of the original HVAC ductwork 40 and the cowl 22 can be reinforced by connecting a forward portion 46 of a bracket 44a (or each of brackets 44a-d) to the cowl 22 and connecting a rearward portion 48 of the bracket 44a (or each of brackets 44a-d) to the retained portions of the original HVAC ductwork 40.

Before or after step 206, the method also includes removing the steering column 12 and steering column bracket 24 from their original locations on the cowl 22 of the truck cab 16, as shown at 208. Thereafter, as shown at 210, the steering column bracket 24 and the steering column 12 are reattached to the cowl 22 on the original passenger's side 14 of the truck cab 16. This may occur directly after the steering column 12 and steering column bracket 24 are removed, or there may be steps intermediate steps 208 and 210, such as if it is easier to attach new HVAC ductwork, dash components, and electronic circuitry before the steering column 12 is reattached. Note also that steps 202 to 210 could occur in a different order or in substeps, for example, if in some vehicles it is necessary or desirable to remove at least the steering column 12 before removing the original dash.

Before the aftermarket dash panel 26 is installed, the method may include connecting the retained portions of the original HVAC ductwork 40 to vents in the aftermarket dash panel 26 by way of aftermarket ducts, as shown at 212. Such vents may be installed, for example, in openings 136, 138 in the aftermarket dash panel 26 as shown in FIGS. 1 and 6. The method may also include connecting the retained portions of the original HVAC ductwork 40 to an aperture 52 or 54 in a portion of the aftermarket dash panel 26 that faces a door of the truck cab 16 by way of at least one of the aftermarket ducts 56 or 62, which aperture 52 or 54 is configured to be aligned with a vent in the door, as shown at 214. In other examples, one or both of the ducts 56, 62 can be part of the original HVAC ductwork 40.

As shown at 216, the method may also include attaching a forward portion of a bracket 64 or 66 to the retained portions of the original HVAC ductwork 40. As described herein above with respect to FIGS. 1 and 6, the forward portion of the bracket 64 or 66 has at least two arms 64a, 64b or 66a, 66b, and the method further comprises connecting each arm 64a, 64b or 66a, 66b to the retained portions of the original HVAC ductwork 40 at distinct locations, such as on either side of an original defrost vent 42b, 42e, respectively. As shown at 218, the method also includes coupling a rearward portion of the first bracket 64 or 66 to the aftermarket dash panel 26. For example, the brackets 64 and/or 66 can be directly connected to the inside face of the aftermarket dash panel 26 by way of bolting, screwing, riveting, welding, or adhering the components together. In other examples, the bracket 64 or 66 that is directly connected to the original HVAC ductwork 40 is not directly connected to the inside face of the aftermarket dash panel 26, but rather is coupled thereto by way of additional brackets in the respective bracket assembly 36 or 38. For example, the bracket 64 or 66 can be part of a bracket assembly 36 or 38 having multiple segments, at least one of the segments including a ring-shaped portion 68 or 70, and the method further includes aligning the ring-shaped portion 68 or 70 with a hole 72 or 74 in the aftermarket dash panel 26 and aligning both the ring-shaped portion 68 or 70 and the hole 72 or 74 around a perimeter of a speaker, as described herein above with respect to FIGS. 1 and 6.

As noted, the bracket assemblies 36, 38 can be connected to the aftermarket dash panel 26 first (step 218) or to the retained portions of the original HVAC ductwork 40 first (step 216). In still other examples, rearward segments of the bracket assemblies 36, 38 are connected to the aftermarket dash panel 26, while forward segments of the bracket assemblies 36, 38 are connected to the retained portions of the original HVAC ductwork 40. The rearward and forward segments of the bracket assemblies 36, 38 are then connected together when the aftermarket dash panel 26 is installed. During such installation, as shown at 220, the method includes fitting cutouts 92a-f in a foremost portion of the aftermarket dash panel 269 around the original defrost vents 42a-f.

As shown at 222, the method may also include attaching a water separator 94 configured to receive air from an atmosphere surrounding the truck cab 16 to a front face 22f of the cowl 22 adjacent an opening 118 in the cowl 22, as described with respect to FIGS. 7 and 8. It may be easier or necessary to do this from inside the engine compartment, although in some cases this can be done from inside the truck cab 16. After the HVAC unit 124 is installed in fluid communication with the opening 118 and thereby with the water separator 94, the method includes attaching an access panel 32 in an HVAC access opening 30 in the aftermarket dash panel 26 by way of at least one of the segments 76 in the multisegmented bracket assembly 36, as described hereinabove with respect to FIGS. 1 and 6.

It should be understood that because the original cowl 22 of the truck is retained in place during the modifications described herein, different openings in the cowl 22 will be required to re-install the steering wheel and other driver-related components on the original passenger's side 14 of the truck cab 16 and to install the HVAC-related components on the original driver's side 18 of the truck cab 16. This can be done by cutting out large openings that remove all of the original openings in the cowl 22, such as along the dashed lines 126, 128 shown in FIG. 2. Doubler plates, for example made of sheet metal, with the correct holes already cut therein or to be cut therein can then be bolted, riveted, welded, or otherwise attached to the cowl 22, likely on the rear face 22r thereof, which is accessible once the original dash components have been removed. An example of one such doubler plate is shown in FIG. 8, covering the opening 126 cut around the original opening 34 for the HVAC connection. The doubler plate 130 includes new openings 132, 134 for components associated with the relocated steering column, as well as other openings needed to provide access between components in the engine compartment and components in the truck cab 16. Although not shown herein, a doubler plate can similarly be installed on the original driver's side 18 of the cowl 22 over the opening 128, with the new opening 118 for the HVAC intake air formed therein.

It should be noted that many of the components and method steps necessary to remove and re-attach a steering column and an HVAC unit on opposite sides from where they were originally installed are not described herein, but would be apparent to those having ordinary skill in the art. The components and method steps noted herein are those that are salient to the novel aspects of the present disclosure, including but not limited to an aftermarket dash panel 26 comprising a single piece configured to extend across an entire width of the truck cab 16, having a full-sized HVAC access panel 32, and being retained in place by way of coupling to retained portions of the original HVAC ductwork 40 in a manner that produces less vibration while the truck is in motion than prior dashes with similar modifications. Additionally, retaining of the original defrost vents 42a-f and the ability to connect the original HVAC ductwork 40 to the side window defrost vents provide better defrost performance than known dashes with similar modifications.

In the present description, certain terms have been used for brevity, clarity, and understanding. No unnecessary limitations are to be implied therefrom beyond the requirement of the prior art because such terms are used for descriptive purposes only and are intended to be broadly construed. The different components and assemblies described herein may be used or sold separately or in combination with other components and assemblies. The different method steps can be performed in any logical order and are not limited to being formed in the order recited in the claims or shown in the figures. Various equivalents, alternatives, and modifications are possible within the scope of the appended claims.

What is claimed is:

1. An assembly facilitating installation of a steering column on an original passenger's side of a truck cab, the assembly comprising:

an aftermarket dash panel having a steering column opening configured to be located on the original passenger's side of the truck cab and an HVAC access opening configured to be located on an original driver's side of the truck cab;

a first bracket having a forward portion configured to be connected to original HVAC ductwork of the truck cab and having a rearward portion configured to be coupled to the aftermarket dash panel; and
a water separator configured to receive air from an atmosphere surrounding the truck cab, the water separator configured to be connected to a front face of a cowl of the truck cab;
wherein the aftermarket dash panel comprises a single piece configured to extend across an entire width of the truck cab;
wherein the water separator comprises an upstream plenum having an inlet receiving the air from the atmosphere and an outlet in fluid communication with a downstream plenum of the water separator; and
wherein the downstream plenum has an inlet receiving the air from the upstream plenum and an outlet configured to be located adjacent an opening in the cowl.

2. The assembly of claim 1, further comprising an access panel configured to be located in the HVAC access opening of the aftermarket dash panel, wherein the first bracket is part of a bracket assembly having multiple segments, and at least one of the segments is configured to support the access panel in the HVAC access opening.

3. The assembly of claim 1, further comprising a duct configured to connect the original HVAC ductwork to an aperture in a portion of the aftermarket dash panel that is configured to face a door of the truck cab, the aperture configured to be aligned with a vent in the door.

4. The assembly of claim 1, wherein the first bracket is part of a bracket assembly having multiple segments, and at least one of the segments has a ring-shaped portion configured to align with a hole in the aftermarket dash panel that is configured to surround a speaker.

5. An assembly facilitating installation of a steering column on an original passenger's side of a truck cab, the assembly comprising:
an aftermarket dash panel having a steering column opening configured to be located on the original passenger's side of the truck cab and an HVAC access opening configured to be located on an original driver's side of the truck cab;
a first bracket having a forward portion configured to be coupled to a cowl of the truck cab and having a rearward portion configured to be coupled to the aftermarket dash panel; and
a water separator configured to receive air from an atmosphere surrounding the truck cab, the water separator configured to be connected to a front face of the cowl;
wherein the aftermarket dash panel comprises a single piece configured to extend across an entire width of the truck cab;
wherein the water separator comprises an upstream plenum having an inlet receiving the air from the atmosphere and an outlet in fluid communication with a downstream plenum of the water separator; and
wherein the downstream plenum has an inlet receiving the air from the upstream plenum and an outlet configured to be located adjacent an opening in the cowl.

6. The assembly of claim 5, further comprising an access panel configured to be located in the HVAC access opening of the aftermarket dash panel.

7. The assembly of claim 6, wherein the first bracket is part of a bracket assembly having multiple segments, and at least one of the segments is configured to support the access panel in the HVAC access opening.

8. The assembly of claim 5, wherein the forward portion of the first bracket is configured to be connected to original HVAC ductwork of the truck cab and the original HVAC ductwork is configured to be coupled to the cowl.

9. The assembly of claim 8, further comprising a duct configured to connect the original HVAC ductwork to an aperture in a portion of the aftermarket dash panel that is configured to face a door of the truck cab, the aperture configured to be aligned with a vent in the door.

10. The assembly of claim 8, wherein a foremost portion of the aftermarket dash panel includes cutouts configured to receive defrost vents in the original HVAC ductwork.

11. The assembly of claim 5, wherein the first bracket is part of a bracket assembly having multiple segments, and at least one of the segments has a ring-shaped portion configured to align with a hole in the aftermarket dash panel that is configured to surround a speaker.

12. The assembly of claim 5, wherein the forward portion of the first bracket comprises at least two arms, each arm configured to be coupled to the cowl at distinct locations.

13. The assembly of claim 5, wherein the outlet of the upstream plenum fits through the inlet of the downstream plenum.

14. An assembly facilitating installation of a steering column on an original passenger's side of a truck cab, the assembly comprising:
an aftermarket dash panel having a steering column opening configured to be located on the original passenger's side of the truck cab and an HVAC access opening configured to be located on an original driver's side of the truck cab;
a bracket assembly configured to couple the aftermarket dash panel to an A-pillar of the truck cab; and
a water separator configured to receive air from an atmosphere surrounding the truck cab, the water separator configured to be connected to a front face of a cowl of the truck cab;
wherein the aftermarket dash panel comprises a single piece configured to extend across an entire width of the truck cab;
wherein the water separator comprises an upstream plenum having an inlet receiving the air from the atmosphere and an outlet in fluid communication with a downstream plenum of the water separator; and
wherein the downstream plenum has an inlet receiving the air from the upstream plenum and an outlet configured to be located adjacent an opening in the cowl.

15. The assembly of claim 14, further comprising an access panel configured to be located in the HVAC access opening of the aftermarket dash panel.

16. The assembly of claim 15, wherein the bracket assembly has multiple segments, and at least one of the segments is configured to support the access panel in the HVAC access opening.

17. The assembly of claim 14, wherein the bracket assembly is also configured to be connected to original HVAC ductwork of the truck cab.

18. The assembly of claim 17, further comprising a duct configured to connect the original HVAC ductwork to an aperture in a portion of the aftermarket dash panel that is configured to face a door of the truck cab, the aperture configured to be aligned with a vent in the door.

19. The assembly of claim 14, wherein the bracket assembly has multiple segments, and at least one of the segments has a ring-shaped portion configured to align with a hole in the aftermarket dash panel that is configured to surround a speaker.

20. The assembly of claim 14, wherein the outlet of the upstream plenum fits through the inlet of the downstream plenum.

\* \* \* \* \*